J. Gibson, Jr,
Tilting Ice Pitcher.
No. 98,245.    Patented Dec. 28. 1869.
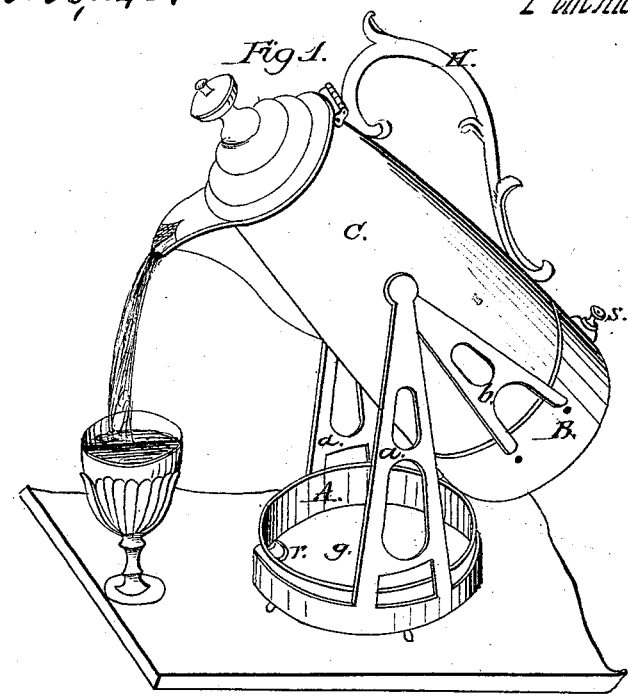
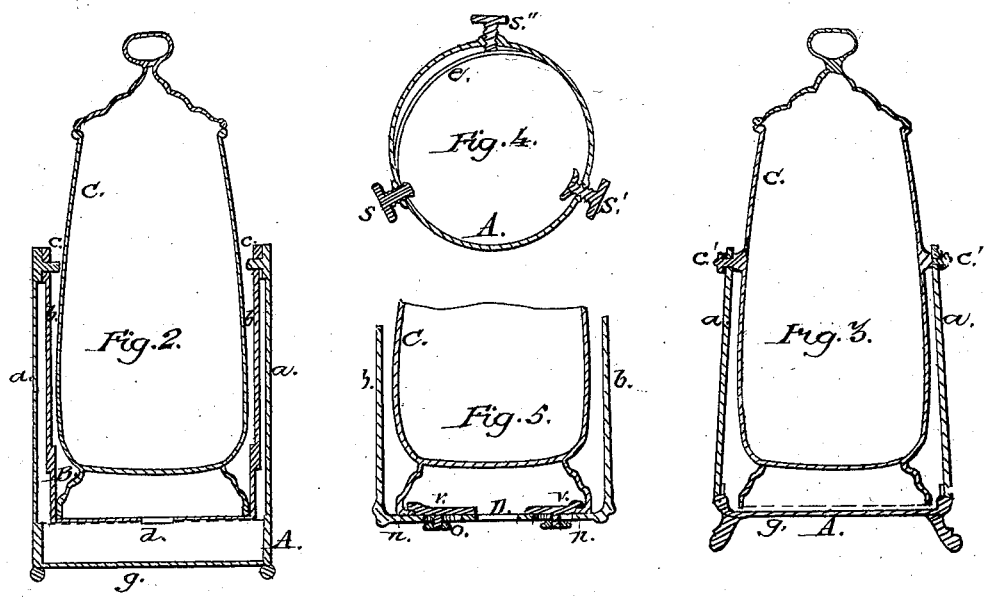
WITNESSES:
A. L. Gibson
T. P. Jones
INVENTOR:
John Gibson Jr

United States Patent Office.

JOHN GIBSON, JR., OF ALBANY, NEW YORK.

Letters Patent No. 98,245, dated December 28, 1869; antedated December 11, 1869.

IMPROVED DEVICE FOR TILTING PITCHERS, COFFEE-POTS, &c.

The Schedule referred to in these Letters Patent and making part of the same.

*To all whom it may concern:*

Be it known that I, JOHN GIBSON, Jr., of the city and county of Albany, and State of New York, have invented certain new and useful Improvements in the Method of Supporting, Securing, and Tilting Pitchers, Coffee-Pots, and similar-constructed vessels, whereby the said vessels may be emptied of their contents with greater ease and facility, and whereby, also, the usual drip or sweat from such vessels may be caught; and I do hereby declare that the following is a full, clear, and exact description thereof, reference being had to the accompanying drawings, forming a part of this specification, and to the letters of reference marked thereon, the same letters referring to similar parts—

Figure 1 represents a perspective view of the invention, with a pitcher tilted, showing, also, the drip-pan, or water-tight base of the stand.

Figure 2 is a cross-section of the invention, in a vertical direction.

Figure 3 is a cross-section in a vertical direction, showing a modification of the invention, dispensing with the suspended rest or basket for holding the vessel and retaining the drip-pan or water-tight base of the stand.

Figure 4 is a vertical view of pitcher-holder or basket, in fig. 2, showing several devices for holding a vessel in place, while being operated or tilted.

Figure 5 is a cross-section, showing another device for effecting the same purpose.

One part of my invention consists in suspending a pitcher, coffee-pot, or other similar vessel, in such a way that it may be readily tilted, to pour out its contents without lifting the said vessel. This, I do, by providing for said pitcher or similar vessel, a suitable rest or basket, to or in which the said vessel may be placed or fastened.

The said rest or basket has attached, on opposite sides, swinging bars or arms, (made plain or ornamental,) which arms reach above the point of centre of gravity in the vessel to be suspended, and are pivoted to a pair of gallows or supports, rising erect from a stand below, which stand supports the whole.

My invention further consists, in providing the base of the supporting-stand with a water-tight pan or receptacle, (made either fast or detachable,) and of any desired size, shape, or pattern, that will catch and retain the drip or sweat that may fall from the vessel suspended, thus obviating the necessity for a separate salver or mat, now generally used for that purpose.

Another part of my invention consists in securing the vessel to be tilted in the suspended basket, or on its equivalent, by means of set-screws, springs, catches, or other device, by which means the said basket or its equivalent, becomes fixed and rigid with the suspended vessel, and thus making the pivots at the upper end of the swinging arms in effect the same as if the said pivots or trunnions were made with, or a part of the said vessel.

To enable others skilled in the art to make and use my invention, I will proceed to describe it in reference to the accompanying drawings, and the letters of reference marked thereon, the same letters indicating like parts.

In the old way to tilt a pitcher or similar vessel, to pour off its contents, a person grasps the handle, and by main strength of the hand and arm, lifts, holds, and tilts the top of the vessel forward, until the water-line within rises above the spout, which operation requires great effort, especially with a vessel of large capacity. Whereas, in my invention, I suspend and hold the vessel to be tilted, by a suitable device, such as a basket, B, figs. 1 and 2, or any similar or equivalent device, suspended by swing bars or arms, $b\ b$, from pivots $c\ c$, placed at a point, which point, when the vessel C is placed in the basket B, or on a rest, B', or their equivalents, will be above the point of the centre of gravity of the vessel so suspended.

I also provide a suitable stand, A, provided with a pair of gallows or standards, $a\ a$, which extend upward to a height at least equal to the point from which the swing arms $b\ b$ are suspended.

If the vessel is constructed with trunnions $c'$, fig. 3, then the basket or its equivalent, and the swing-arms $b\ b$, may be dispensed with, and a stand, A, with gallows $a\ a$, alone will be needed. Or, the trunnions $c'\ c'$ may be dispensed with on the vessel, and may be made with or on the gallows $a\ a$, and suitable bearings or recesses may be made on the sides of the vessel. The stand with its gallows, and the basket or rest with its swing-arms, may be made of metal or any other suitable material, and of such a form, and with such ornamentation, as taste or fancy may dictate.

The stand A is provided with a water-tight bottom, $g$, figs. 1, 2, 3, constructed to catch and hold the drip or sweat from the suspended vessel, or a detachable drip-pan may fitted to and used with said stand, for the same purpose.

When a basket or rest is used to support the vessel, the said vessel may be secured to or in the said rest or basket, by means of set-screws S, fig. 4, or padded set-screws S', or a spring, $e$, tightened by the impingement of a screw, S'', or by any other equivalent devices.

Or, if the base of the vessel C is provided with a flange, $n$, (as shown in fig. 5,) made on either the inner or outer periphery of the said base, the said vessel may, by the means of the said flange $n$, be securely held in position by the aid of dogs V, moving in guide-slots O O, made in the bottom of the said basket B or rest B', said dogs being fastened by bolts, screws, or otherwise. Or any other suitable device for holding the vessel secure in the basket B or on the rest B', may be used. Or the front portion of the said basket B or rest B' may be made sufficiently high to hold a pitcher or other vessel safely, without the aid of any device to clasp or fasten said vessel at the base or rear.

In using my invention, when the vessel is suspended from the gallows or supports $a\ a$, either by the swing-arms of the basket B or rest B', or by the trunnions $c'$, the person operating the vessel, to pour out its contents, lifts upward on the handle H, as in fig. 1, which lifting causes the bottom of the said vessel to swing back and upward, and causes the liquid to flow from the spout or pouring-lip of the vessel as it is depressed, (as shown in fig. 1,) and the drip, if any, will fall into and be caught by the water-tight base $g$ of the stand A, as also would be the sweat or condensation of moisture which usually attends vessels containing cold liquids.

Having described my invention, I do not claim suspending pitchers, coffee-pots, or similar vessels, from a point above the centre of gravity, as that may have been done; but it is to be understood, that one part of my invention consists in suspending and swinging a pitcher, or any similar vessel, having a handle H on the side opposite from the spout or pouring-lip, and gallows or supports $a\ a$ attached to the stand A, whereby the said vessel is so suspended, as will enable the operator, by means of the handle H, (which handle may be on the vessel or on the basket,) to tilt the spout of the vessel downward, as in fig. 1.

What I claim, and desire to secure by Letters Patent, is—

1. The swinging basket B or swinging rest B', for holding or supporting the vessel C, substantially as described, and working in combination with the pivots $c$, substantially as described, for the purposes set forth.

2. In combination with a stand, A, for supporting and tilting a pitcher or other vessel, a water-tight base or receptacle, $g$, made with the said stand A, or fitted to and made detachable therefrom, for the purpose substantially as set forth and described.

3. The stand A, (either with or without the water-tight base or receptacle $g$,) provided with the gallows or supports $a\ a$, in combination with the swinging basket B, or swinging rest B', substantially as and for purposes set forth and described.

4. In combination with the swinging basket B, the screw S or S', or spring $e$ and screw S'', or their equivalents, substantially as and for the purpose set forth and described.

5. The stop $r$ or its equivalent, in combination with the stand A or supporting standards $a$, or suspending-arms $b$, or basket B, or base B', as and for the purpose specified.

JOHN GIBSON, Jr.

Witnesses:
  A. L. Gibson,
  T. P. Jones.